Dec. 11, 1956   H. M. LEFEVRE   2,773,495
METHOD OF FABRICATING A CABLE VARIETY STONE CUTTING SAW
Filed Dec. 9, 1953   4 Sheets-Sheet 1
Fig. 1
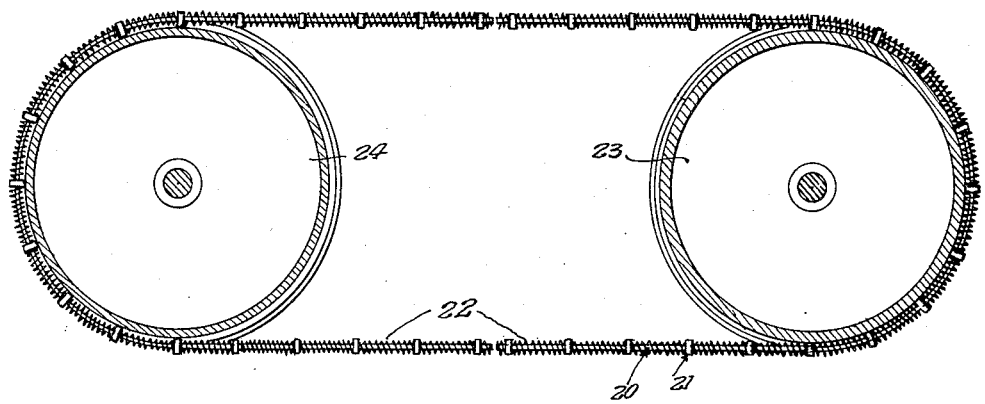
Fig. 2
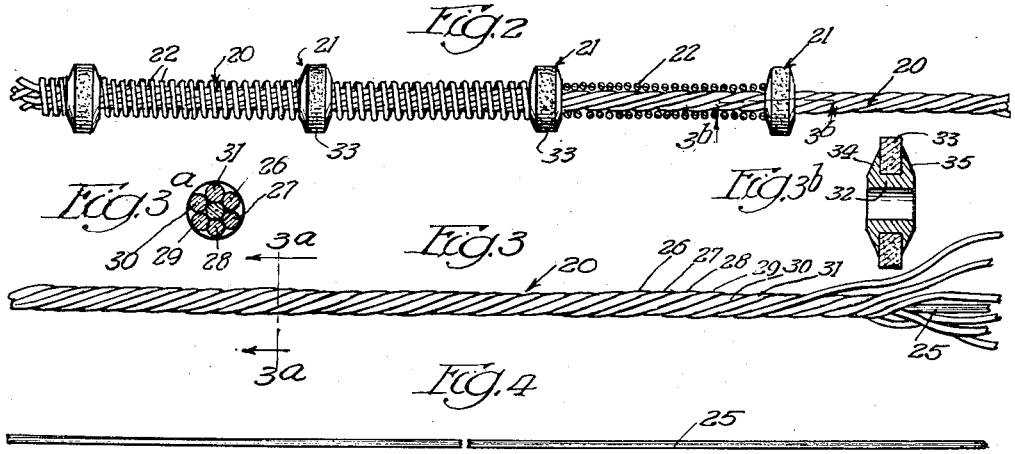
Fig. 3   Fig. 3a   Fig. 3b
Fig. 4
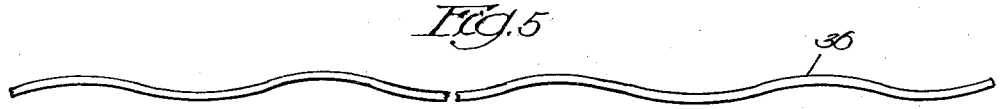
Fig. 5
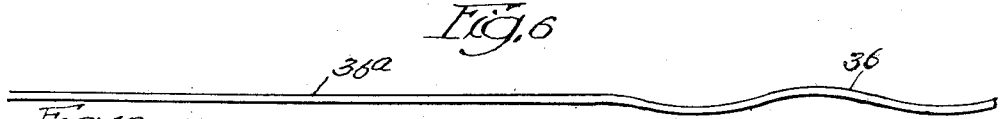
Fig. 6
Fig. 14   Fig. 15
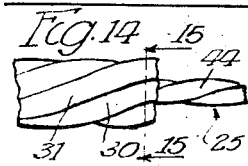 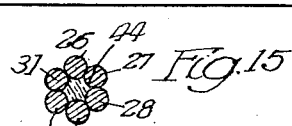
Inventor
Hubert M. Lefevre
By Thed Gerlach atty.

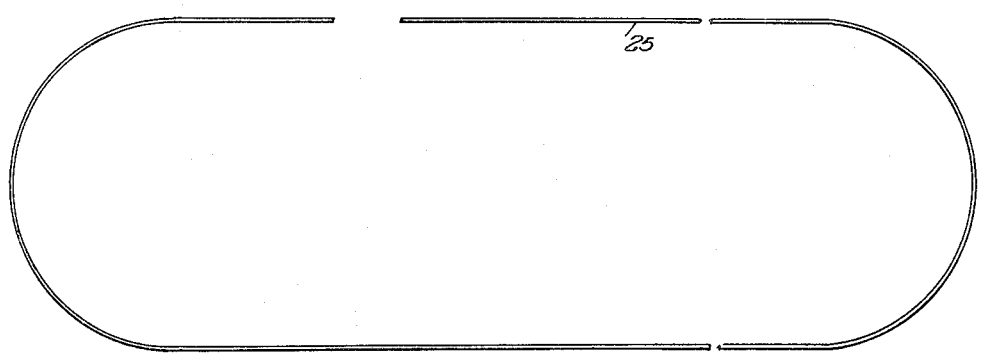
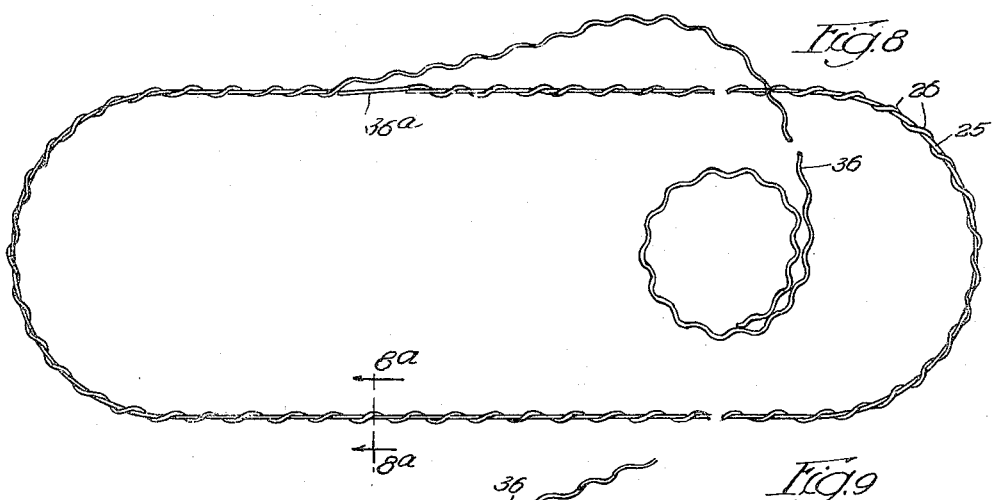
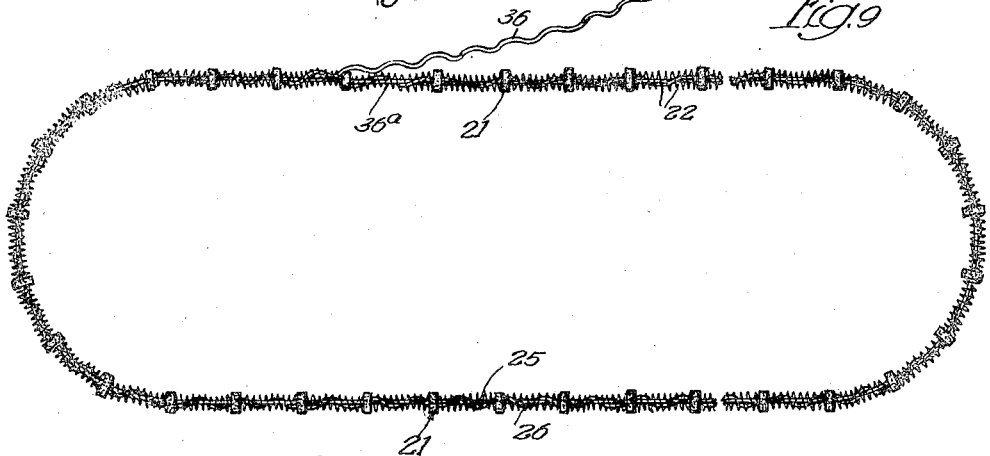

Dec. 11, 1956   H. M. LEFEVRE   2,773,495
METHOD OF FABRICATING A CABLE VARIETY STONE CUTTING SAW
Filed Dec. 9, 1953   4 Sheets-Sheet 3
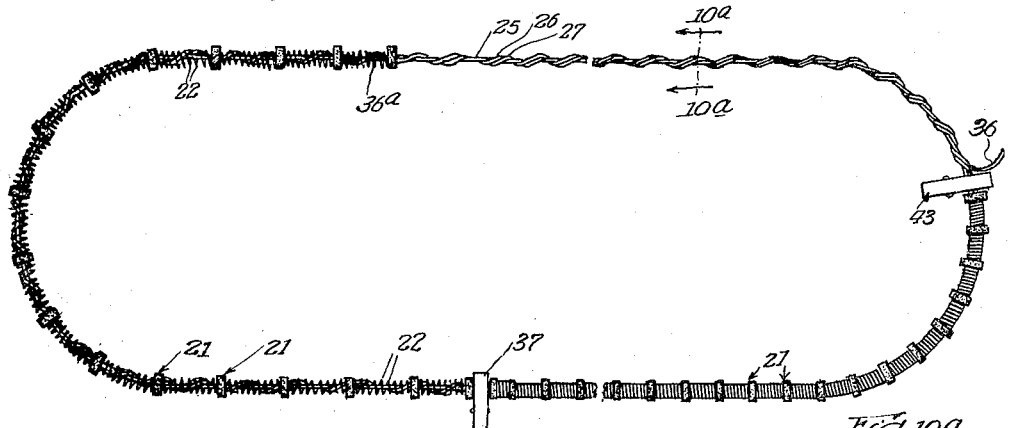
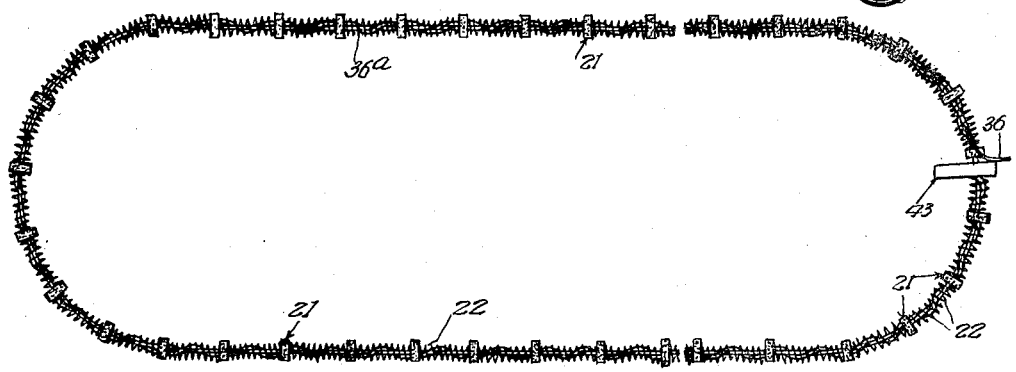
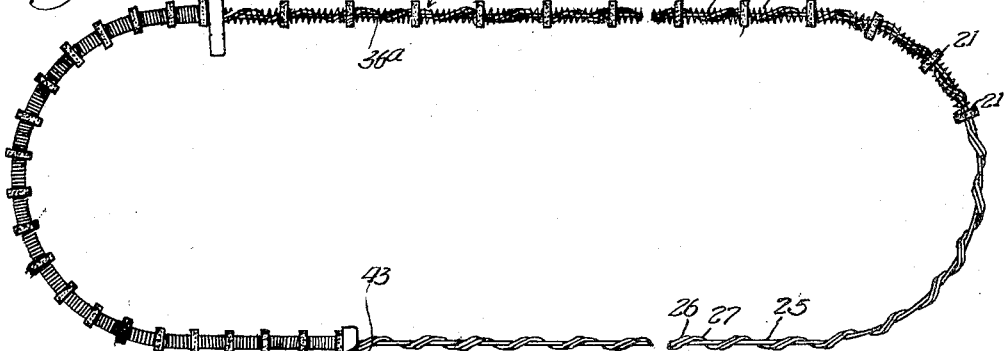
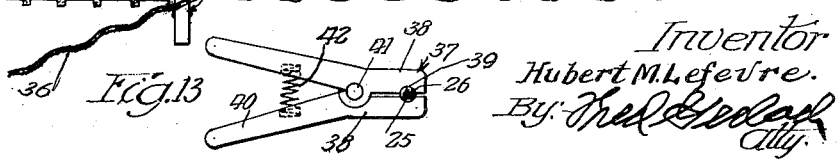
Inventor
Hubert M. Lefevre.

Dec. 11, 1956  H. M. LEFEVRE  2,773,495
METHOD OF FABRICATING A CABLE VARIETY STONE CUTTING SAW
Filed Dec. 9, 1953  4 Sheets-Sheet 4
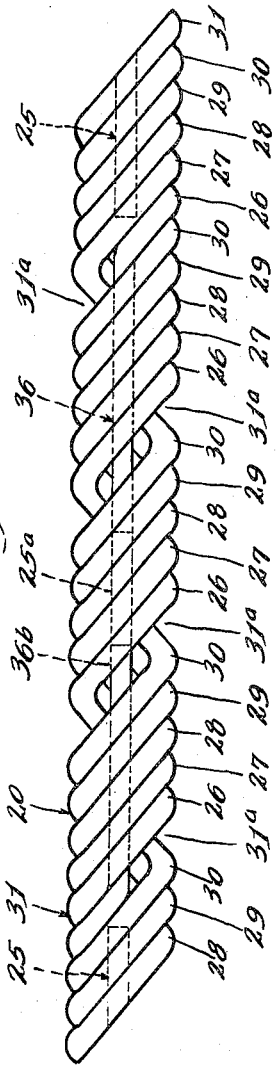
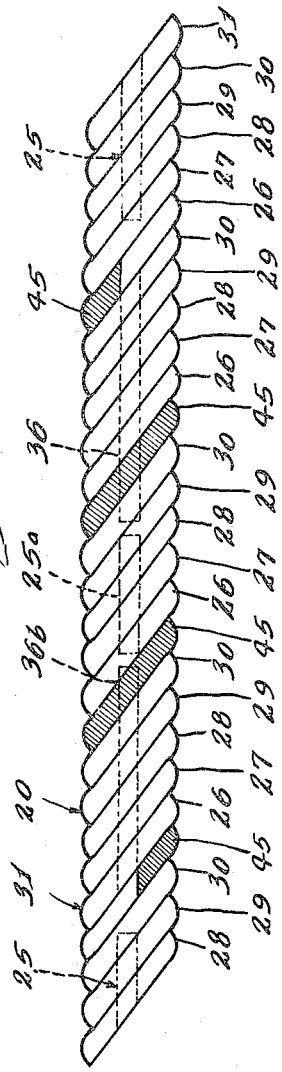
Inventor:
Hubert M. Lefevre.
By Fred Gerlach
Attorney

United States Patent Office 2,773,495
Patented Dec. 11, 1956

2,773,495

METHOD OF FABRICATING A CABLE VARIETY STONE CUTTING SAW

Hubert M. Lefevre, Bonnevil-en-Valois, France

Application December 9, 1953, Serial No. 397,126

5 Claims. (Cl. 125—21)

The present invention relates generally to saws for cutting stone, such, for example, as limestone, marble or granite. More particularly the invention relates to that type of saw which is known in the art as a cable variety stone cutting saw and as its parts or components comprises: (1) an endless flexible cable which is adapted to be trained around and supported by a pair of spaced apart pulleys with circumferentially grooved rims or peripheries and consists of a core and a predetermined number of preset spiral wire strands which are wrapped spirally around, and completely encompass, the core and have the convolutions thereof in side by side relation; (2) a plurality of centrally apertured cutting elements which are loosely mounted on the cable in spaced apart relation; and (3) a plurality of spiral compression springs which are mounted on the cable between the cutting elements and serve to space the elements apart while at the same time permitting them to slide to a limited extent lengthwise of the cable during a stone cutting operation.

The main or principal object of the invention is to provide a method whereby a cable variety stone cutting saw of the aforementioned type may be fabricated with facility and at a comparatively low cost and also in such manner that the cable is for all intents and purposes continuous and has no welded or soldered joints which, in connection with operation of the saw, would be likely to fracture or break and thus render the saw useless or inoperative. In general the method involves or comprehends the following steps: first, cutting the core for the cable of the saw from a length of core stock so that the length thereof is substantially the same as the desired total length of the saw cable to be formed; second, manipulating the previously cut core so that it is in the form of a loop and has the ends thereof positioned adjacent one another; third, cutting from conventional wire cable stock having the same number of spiral wire strands as the saw cable to be formed a section of the cable the length of which is slightly more than the desired total length of the saw cable multiplied by the number of spiral wire strands that the complete saw cable is to have; fourth, unwinding one of the strands of the cut section of conventional wire cable stock in order to provide a single pre-set spiral wire piece for forming the strands of the cable of the saw; fifth, manipulating the piece into a coil in order to facilitate subsequent handling thereof; sixth, positioning one end of the coiled piece in juxtaposition with one end of the core; seventh, winding the next following part of the piece spirally and progressively around the core until it engages and encompasses the core throughout the latter's entire length and forms the first strand of the cable for the saw; eighth, sliding the centrally apertured cutting elements and the spiral compression springs one at a time and in alternating relation onto the juxtapositioned ends of the core and the pre-set spiral wire piece and at the same time moving them lengthwise of the core and the first strand of the cable until they are all positioned in a continuous series along the core and the first strand; ninth, applying a first stop-forming clamp to a portion of the core and first strand that is at an appreciable distance from the aforementioned juxtapositioned ends of the core and the pre-set spiral wire piece; tenth, sliding the last applied cutting element or compression spring in the direction of the first clamp so as to compress the springs between it and the first clamp and expose the following portion of the core and first strand of the saw cable; eleventh, applying a second stop-forming clamp to the leading end of the exposed portion of the core and first strand and so that it abuts against and forms a stop for the last applied cutting element or spring and coacts with the first clamp to hold the springs therebetween in a compressed condition; twelfth, winding the next following part of the pre-set spiral wire piece spirally and progressively around the exposed portion of the core and first strand in order to form a portion of the second strand of the saw cable; thirteenth, removing the first clamp so that the springs expand to their normal length and cause certain of the cutting elements and springs to slide over and cover the aforementioned portion of the second strand and the adjacent portion of the core and first strand; fourteenth, applying the first clamp to a location on the core and first strand an appreciable distance ahead of its original location or position; fifteenth, removing the second clamp: sixteenth, sliding the last applied cutting element or spring in the direction of the reapplied first clamp in order to compress the springs between it and the first clamp and expose the next following portion of the core and first strand; seventeenth, applying the second clamp to the leading end of the last exposed portion of the core and first strand so that it abuts against and forms a stop for the last applied cutting element or spring and coacts with the reapplied first clamp to hold the springs therebetween in a compressed condition; eighteenth, winding the next following portion of the pre-set spiral wire piece spirally and progressively around the last exposed portion of the core and first strand in order to form another portion of the second strand of the saw cable; and nineteenth, continuing in sequence steps like the thirteenth to the eighteenth, inclusive, until the balance of the second strand and all of the other strands of the saw cable are formed and the saw as a whole is complete. The method also contemplates utilizing nylon or like "plastic" material to form the core in order that when the completed saw is stretched in connection with the initial use thereof the various convolutions of the pre-set spiral wire strands will form in the core spiral grooves whereby the convolutions are so interlocked with the core that, during drive of the saw by way of the pulleys around which the saw is trained, slippage of the strands is effectively prevented. In addition, the method comprehends as additional steps straightening the extremity of the leading end of the single pre-set spiral wire piece after unwinding one of the strands from the cut section of conventional wire cable stock and positioning the straightened extremity between the ends of the core as a preliminary to the first winding operation, i. e., winding of the piece spirally around the core until it engages and encompasses the core throughout the latter's entire length and forms the first strand of the saw cable.

The steps described above contemplate driving the saw in a direction so that the free end of the described last end of the newly formed cable will trail. This is satisfactory if the saw is operated dry. However if the stone to be sawed is of such texture as to make it desirable to use a liquid coolant such as water, the water together with the powdered stone particles cut away in sawing tend to form a sludge which creeps or builds up under the said free end, which in turn forces this free end outwards from the core, in effect enlarging the outer diameter of the cable which impairs the free movement of the springs and cutting elements. In such event it is preferred to employ an additional step wherein the free end of the last strand formed by the aforementioned winding of the single pre-set spiral wire piece is straightened similarly to its leading end and is positioned so as to replace a corresponding length of the trailing end of the nylon core, or a corresponding length of the nylon core near its trailing end. In such case the piece of nylon core to be replaced is removed before positioning the said straightened free end of the last wire strand. It is sometimes advantageous to allow a small length of nylon core, for example between one inch and ten inches, to remain between the said leading and trailing ends of the single pre-set spiral wire piece. The advantage of so doing is to have some core remain between the two straightened ends when the tension applied in stretching the cable in usage is so great, that it causes the said ends to pull slightly apart with relation to each other.

Whether or not this short piece of nylon core mentioned is left in the cable, the cable would appear externally to have one strand less for a small distance. This distance corresponds to the length of the straightened leading end plus the length of the straightened trailing end just mentioned, plus the length of any small piece of nylon core which may have been permitted to remain between the said straightened ends. This empty space which would otherwise be occupied by the trailing end of the last spiral wire strand may be filled with lead, or plastic or other appropriate filler material of such nature as to be not injurious to the nylon core when said filler is applied, thus giving the same outside diameter over this portion as the rest of the cable. It is not too important if a small quantity of this filler material is lost in the operation of the saw cable.

When the trailing end of the last strand of spiral wire is straightened and positioned to replace a small piece of the nylon core as described above, the cable saw may be operated in either direction, whether or not water is used, and with equal success.

Other objects of the invention and the various advantages and characteristics of the present method of fabricating a cable variety of stone cutting saw will be apparent from a consideration of the following detailed description.

The invention consists in the method which is hereinafter set forth more in detail and is particularly defined by claims at the conclusion hereof.

In the drawings which accompany and form a part of this specification or disclosure and in whch like numerals of reference denote corresponding parts throughout the several views:

Figure 1 is a side view showing in operative relation with a pair of pulleys a cable variety stone cutting saw fabricated in accordance with the present method;

Figure 2 is an enlarged side view of a portion of the saw showing in detail the construction and arrangement of the centrally apertured cutting elements and the spiral compression springs which are mounted on the cable of the saw between the cutting elements and serve to space the elements apart;

Figure 3 is a side view of a portion of the cable of the saw;

Figure 3a is a transverse section taken on the line 3a—3a of Figure 3 and illustrating in detail the cross sectional construction of the cable of the saw;

Figure 3b is a section taken on the line 3b—3b of Figure 2 and showing the construction and design of the cutting elements of the saw;

Figure 4 is a fragmentary side view showing the core of the cable after it has been cut from a length of nylon core stock but before it is manipulated into loop form;

Figure 5 is a fragmentary side view of the single pre-set spiral wire piece which is obtained by removing one of the strands of a cut section of conventional wire cable stock and serves to form the strands of the cable of the saw;

Figure 6 is a view showing the pre-set spiral wire piece of Figure 5 after the extremity of the leading end thereof has been straightened;

Figure 7 is a side view illustrating the method step which comprises manipulating the core so that it is in the form of a loop and has the ends thereof disposed in opposed but spaced apart relation;

Figure 8 is a side view illustrating the method steps that comprise inserting the straightened extremity of the leading end of the pre-set spiral wire piece in the gap or space between the oppositely disposed ends of the core and then winding the piece spirally around the core until it engages and encompasses the core throughout the latter's entire length and forms the first strand of the saw cable;

Figure 8a is a transverse section on the line 8a—8a of Figure 8;

Figure 9 is a side view illustrating the method step that comprises sliding the centrally apertured cutting elements and the spiral compression springs one at a time and in alternating relation onto the straightened extremity of the leading end of the piece and the adjacent end of the core and moving them lengthwise of the core and the first strand of the saw cable until they are all positioned in a continuous series along the core and the first strand;

Figure 10 is a side view showing the first stop-forming clamp after it has been applied to a portion of the core and first strand that is an appreciable distance from the straightened extremity of the pre-set spiral wire piece, showing the cutting elements and compression springs between the first clamp and the straightened extremity of the piece after they have been moved towards the first clamp in order to expose a portion of the core and first strand, showing the second stop-forming clamp after it has been applied to the leading end of the first portion of the core and first strand so that it abuts against and forms a stop for the last applied cutting element or spring and coacts with the first clamp to hold the springs therebetween in a compressed condition, and showing the next following part of the pre-set spiral wire piece after it has been partially wound around the exposed portion of the core and first strand in order to form a portion of the second strand of the saw cable;

Figure 10a is a transverse section on the line 10a—10a of Figure 10;

Figure 11 is a side view illustrating the arrangement of the cutting elements and compression springs after removal of the first clamp from its original position as shown in Figure 10;

Figure 12 is a side view showing the first clamp after it has been applied to a location on the core and first strand an appreciable distance ahead of its original location or position, showing the last applied cutting element or spring slid forward in order to compress the springs between it and the first clamp and expose the next following portion of the core and first strand, showing the second clamp after it is applied to the leading end of last exposed portion of the core and first strand so that it abuts against and forms a stop for the last applied cutting element or spring and coacts with the re-applied first clamp to hold the springs therebetween in a compressed condition, and showing the next following portion of the pre-set spiral wire piece after it has been wound around the last exposed portion of the core and first strand in order to form another portion of the second strand of the saw cable;

Figure 13 is an enlarged side view of the first stop-forming clamp, illustrating in detail the design and construction of such clamp;

Figure 14 is an enlarged fragmentary side view showing the complete saw cable after it has been so initially stretched that the various convolutions of the spiral wire strands thereof form interlocking spiral grooves in the nylon core of the cable; and Figure 15 is an enlarged transverse section on the line 15—15 of Fig. 14.

Figure 16 is an enlarged side view showing that portion of the cable where the straightened leading and trailing ends of the single pre-set spiral wire piece have both been positioned in the center of the cable actually forming a part of the core, and a small length of nylon core permitted to remain between such straightened ends, but before appreciable tension has been applied to the cable.

Figure 17 is the same as Figure 16 except that it shows what occurs after appreciable tension has been applied to the cable, and illustrates how the straightened leading and trailing ends of the single pre-set spiral wire piece have pulled apart with relation to each other, and how the small length of nylon core permitted to remain between such straightened ends helps to fill out the space where otherwise there would have been no core.

Specifically speaking the invention involves a particular method of fabricating or producing a cable variety stone cutting saw. As shown in Figures 1 and 2 of the drawings, the saw comprises an endless flexible cable 20, a plurality of cutting elements 21 and a plurality of spiral compression springs 22. In connection with use, the saw is trained around a pair of spaced apart pulleys 23 and 24. The latter have circumferentially grooved peripheries or rims and serve when one of the pulleys is driven by power driving means (not shown) to cause the saw to travel. The two pulleys cause the saw to have upper and lower reaches. It is contemplated that in connection with use of the saw the stone to be cut and the saw will be moved one relatively to the other in order that one reach of the saw will effect cutting of the stone as the result of the cutting action of the cutting elements 21. The endless flexible cable 20 of the saw comprises a core 25 and a plurality of spiral wire strands around the core. The core is formed of nylon or like "plastic" material which is flexible while at the same time it is sufficiently plastic so that depressions, if formed therein, will stay or remain. The spiral wire strands are shown in the drawings as being six in number, although it is to be understood that more or less strands may be employed, if desired. They are designated in the drawings by the reference numerals 26, 27, 28, 29, 30 and 31 and are so arranged that they completely encompass the core 25 and have the convolutions thereof in abutting and side by side relation. As pointed out hereafter, the six strands are formed of a single pre-set spiral wire piece in order that the cable for all intents and purposes is continuous and has no welded or soldered joints which, in connection with operation of the saw, would be likely to fracture or break and thus render the saw useless or inoperative. The cable 20 of the saw is formed to that it has a predetermined length. The cutting elements 21 of the saw are mounted on the cable 20 in spaced apart relation and preferably consist of tubular metallic body parts 32 and annular cutting parts 33. The body parts are provided at the ends thereof with integral outwardly extending flanges 34 and 35 and have smooth unobstructed cylindrical inner peripheries which fit loosely around the cable 20 in order that the cutting elements 21 are permitted to slide or move lengthwise of the cable. The annular cutting parts 33 extend around the central portions of the tubular body parts 32. They are disposed between the outwardly extending flanges 34 and 35 and may consist of rigid metallic matrices and crushed or fragmented diamonds distributed substantially uniformly throughout the matrices. The spiral compression springs 22 extend around the cable 20 and are disposed between the cutting elements 21. They serve to space apart the cutting elements while at the same time permitting the elements to slide to a limited extent lengthwise of the cable during a stone cutting operation.

The saw is fabricated or produced by first cutting the core 25 from a length of nylon core stock so that the length thereof is slightly less than the desired total length of the cable 20 of the saw. Preferably the core stock from which the core 25 is cut has the same diameter as the spiral wire strands of the cable. The core 25, after being cut to the proper length from the core stock, is manipulated so that it is in the form of a loop and has the ends thereof spaced a small distance apart as shown in Figure 7 of the drawings. It is contemplated that the ends of the core will be spaced apart such a distance that the length of the distance together with the length of the core will equal the predetermined length of the cable 20 of the saw. The next step in fabricating the saw consists in producing a single pre-set spiral wire piece like that which is shown in Figures 5, 6, 8, 9, 10, 11 and 12 of the drawings and is designated by the reference numeral 36. It is contemplated that the length of the piece 36 will be slightly greater than the total length of the saw cable multiplied by the number of the spiral wire strands that the cable is to have. If the cable is to have six spiral wire strands as shown in the drawings, the length of the single pre-set spiral wire piece 25 will be slightly greater than six times the total length of the cable 20 of the saw. The piece 36 is obtained by cutting from conventional wire cable stock having the same number of spiral wire strands as the saw cable to be formed a section of cable, the length of which is slightly more than the desired total length of the saw cable times the number of spiral wire strands that the complete saw cable is to have. After cutting of the conventional wire cable stock into the aforementioned section one of the strands of the section is removed by unwinding it from the other strands. The unwound strand then forms the single pre-set spiral wire piece 36. After the piece 36 is obtained in the aforementioned manner the extremity of the leading end thereof is straightened as shown in Figure 6 of the drawings. The straightened extremity is designated in the drawings by the reference numeral 36a. It is contemplated that the length of the straightened extremity will be equal to the length of the space or gap between the oppositely disposed ends of the nylon core 25. After the straightening operation the single pre-set spiral wire piece 36 is formed into a coil in order to facilitate subsequent handling thereof. Thereafter the straightened extremity 36a of the leading end of the piece is positioned or located in the space between the ends of the nylon core in such manner that it is substantially aligned with the nylon core ends as shown in Figure 8. After insertion of the straightened extremity 36a of the leading end of the piece 36 into place the next following part of the piece is spirally wound around the core 25 until it engages and encompasses the core throughout the latter's entire length and forms the first strand (strand 26) of the cable 20. The winding operation is effected by turning the aforementioned coil bodily and continuously around the core while at the same time revolving the coil about its axis so as progressively to feed out the portion of the piece 36 that leads to the core. As soon as the first spiral wire strand 26 is formed the centrally apertured cutting elements 21 and the spiral compression springs 22 are slid one at a time and in alternating relation onto the straightened extremity of the leading end of the piece 36 and at the same time are moved or slid lengthwise of the core and the first strand until they are all positioned in a continuous series along the core and first strand as shown in Figure 9 of the drawings. The next step of the method consists in applying a stop-forming clamp 37 to a portion of the core and first strand that is at an appreciable distance from the aforementioned straightened extremity of the piece 36. Such clamp may be of any suitable form. The form of clamp that is shown in the drawings (see Figure 13) comprises a pair of oppositely disposed members 38 each of which is in the form of a wide angled V. Certain opposed ends of the members 38 are shaped to form jaws 39 and the other opposed ends of the members form handles 40. The apices of the members 38 are connected by a pivot pin 41 in order that the members are free to rock or pivot one relatively to the other. A helical compression spring 42 extends between the inner portions of the handles 40 and serves to urge the members so that the jaws 39 normally remain in an operative position wherein they are in abutment with one another. When it is desired to open the jaws inward pressure is exerted on the handles 40. Release of the handles results in the spring 42 swinging the jaws 39 inwards into their operative or clamping position. After the clamp 37 is positioned as shown in Figure 10 the cutting element or spring which was last applied to the straightened extremity of the piece 36 is slid in a clockwise direction towards the clamp 37 so as to compress the springs 22 between it and the first clamp and exposes a portion of the core 25 and the first strand 26. At the conclusion of this operation or step a stop-forming clamp 43, like the clamp 37, is applied to the leading end of the exposed portion of the core and first strand so that it abuts against and forms a stop for the last applied cutting element or spring and coacts with the clamp 37 to hold the springs therebetween in a compressed condition. The next step of the method consists in winding the next following part of the preset spiral wire piece 36 around the exposed portion of the core and first strand in order to form a portion of the second strand 27 of the cable 20 (see Figure 10). After the first or initial portion of the second strand 27 is formed the clamp 37 is removed. This results in the compressed springs expending to their normal length and automatically causing certain of the cutting elements and springs to slide over and cover the first formed portion of the second strand and the adjacent portions of the core and first strand (see Figure 11). After removal or release of the clamp 37 such clamp is applied, as shown in Figure 12, to a location on the core and first strand an appreciable distance ahead of its original location or position. Thereafter the clamp 43 is removed. Directly following removal of the clamp 43 the last applied cutting element or spring is slid in the direction of the reapplied clamp 37 in order to compress the springs between it and the clamp 37 and expose the next following portion of the core and first strand. The next step of the method consists in applying the clamp 43 to the leading end of the last exposed portion of the core 25 and the first strand 26 so that it abuts against and forms a stop for the last applied cutting element or spring and coacts with the reapplied clamp 37 to hold the springs therebetween in a compressed condition. Directly following the last mentioned stop the next following portion of the pre-set spiral wire piece 36 is wound around the last exposed portion of the core and first strand in order to form another or the next succeeding portion of the second strand 27 of the cable 20. Directly following the last mentioned step the clamp manipulating, the spring compressing and the winding steps are continued in proper order or sequence until the balance of the second spiral wire strand 27 and the four other spiral wire strands 28, 29, 30 and 31 are formed around the core 25 and the saw as a whole is completely or fully formed.

It is contemplated that the saw after being formed as hereinbefore pointed out will be trained around the pulleys 23 and 24 and the pulleys will then be urged apart by suitable adjustable mounting means in order to place the saw as a whole under tension to the end that it is useable in connection with drive of the pulleys for stone cutting purposes. When the cable 20 of the saw is initially stretched or placed under tension the various convolutions of the spiral wire strands will form in the core 25 spiral grooves whereby the convolutions are so interlocked with the core 25 that during drive of the pulleys slippage of the strands will not occur. The grooves are shown in Figure 14 of the drawings. They are designated by the reference numeral 44 and when once formed remain in a set condition.

It is contemplated that in connection with use the saw will be driven in such direction that the free end of the sixth strand will trail. By driving the saw in such direction the cutting elements and springs cannot catch on the free end of the sixth strand of the cable saw if that end has been left free. This is satisfactory if the saw is operated dry in connection with cutting of soft stone.

However, if the stone is hard and is of such texture as to make it desirable to use a liquid such as water as a coolant and lubricant for the cutting elements, the water together with the powdered stone particles cut away in sawing tends to form a sludge which creeps or builds up under the free end of the last formed strand 31, which in turn forces this free end 36 outward from the core 25, in effect enlarging the outer diameter of the cable 20, which impairs the free movement of the springs 22 and cutting elements 21. In such event it is preferred to employ an additional step in making the cable 20 as is shown in Figure 16, wherein the free end 36b of the last strand 31 formed by the aforementioned winding of the single preset spiral wire piece 36 is straightened similarly to the leading end 36a and is positioned so as to replace a corresponding length of the trailing end of the nylon core 25, or a corresponding length of the nylon core 25 near its trailing end. In such case the piece of nylon core 25 to be replaced is removed before positioning the said straightened free end of the last wire strand 31. It is sometimes advantageous to allow a small length 25a of nylon core, for example between one inch and ten inches in length, to remain between the straightened leading and trailing ends 36a and 36b of the single pre-set spiral wire piece 36. The advantage of so doing is to have some core remain between the two straightened ends 36a and 36b when the tension applied in stretching the cable 20 in usage is so great that it causes said ends 36a and 36b to pull slightly apart with relation to each other, as is shown in Figure 17.

If the small length 25a of nylon core is not permitted to remain between the two straightened ends 36a and 36b, these ends 36a and 36b are positioned as nearly abutting each other as is possible when inserting end 36b in place of the nylon core removed and previously mentioned (not shown).

Whether or not this short or small length 25a of nylon core is left in the cable 20, the cable 20 would appear externally to have a gap or empty space 31a in the last strand 31, for a small distance as is shown in Figure 16 and Figure 17. This distance corresponds to the length of the straightened trailing end 36b plus the length of straightened leading end 36a, plus the length of the small piece 25a of nylon core if this piece of nylon core has been permitted to remain between straightened ends 36b and 36a.

This gap or empty space 31a, which would otherwise be occupied by the trailing end of the last spiral wire strand 31, may be filled with a filling 45 of lead or plastic or other appropriate filler material of such nature as to be not injurious to the nylon core 25a when said filler is applied, thus giving the same outside diameter over this portion as the rest of the cable 20. It is not too important if a small quantity of this material is lost in the operation of the saw.

The herein described method is an essentially simple one and may be carried out with facility. It results in a cable variety stone cutting saw the cable of which is for all intents and purposes continuous and has no welded or soldered joints which in connection with operation of the saw would be likely to fracture or break and thus render the saw useless, and if the straightened end 36b is positioned as described the cable 20 may be run successfully in either direction.

The invention is not to be understood as restricted to the particular steps or the sequence of steps as heretofore specifically set forth since these may be modified within the scope of the appended claims without departing from the spirit and scope of the invention.

Having thus described the invention what I claim as new and desire to secure by Letters Patent is:

1. That improvement in the fabrication of a cable variety stone cutting saw of the type that consists of an endless flexible cable of predetermined length and in the form of a normally straight core and a predetermined number of side by side spiral wire strands around the core, a plurality of centrally apertured cutting elements mounted loosely on the cable in spaced apart relation and a plurality of spiral compression springs mounted loosely on the cable between the cutting elements, which comprises the following steps: first, cutting the core of the cable from normally straight core stock so that the length thereof is slightly less than the predetermined length of the cable to be formed; second, manipulating the cut core so that it is in the form of a loop and has the ends thereof disposed in opposed but spaced apart relation; third, cutting from conventional wire cable stock having the same number of spiral wire strands as the saw cable to be formed a section of cable the length of which is substantially equal to the desired total length of the saw cable multiplied by the number of spiral strands that the complete saw cable is to have; fourth, unwinding one of the strands of the cut section of conventional wire cable stock in order to provide a single pre-set spiral wire piece; fifth, straightening the extremity of one end of the piece; sixth, positioning the straightened extremity of the piece in the space between the ends of the core; seventh, winding the next following part of the piece spirally and progressively around the core until it engages and encompasses the core throughout the latter's entire length and forms the first strand of the cable for the saw; eighth, sliding the centrally apertured cutting elements and the spiral compression springs one at a time and in alternating relation onto the straightened extremity of the piece and at the same time moving them lengthwise of the core and the first strand of the cable until they are all positioned in a continuous series along the core and the first strand; ninth, applying a first stop-forming clamp to a portion of the core and first strand that is at an appreciable distance from the aforementioned juxtapositioned ends of the core and the piece; tenth, sliding the last applied cutting element or compression spring in the direction of the first clamp so as to compress the springs between it and the first clamp and expose the following portion of the core and first strand; eleventh, applying a second stop-forming clamp to the leading end of the exposed portion of the core and first strand and so that it abuts against and forms a stop for the last applied cutting element or spring and coacts with the first clamp to hold the springs therebetween in a compressed condition; twelfth, winding the next following part of the piece spirally and progressively around said exposed portion of the core and first strand in order to form a portion of the second strand of the cable for the saw; thirteenth, removing the first clamp in order that the springs expand to their normal length and cause certain of the cutting elements and springs to slide over and cover the aforementioned portion of the second strand and the adjacent portion of the core and first strand; fourteenth, applying the first clamp to a location on the core and first strand an appreciable distance ahead of its original location or position; fifteenth, removing the second clamp; sixteenth, sliding the last applied cutting element or spring in the direction of the reapplied first clamp in order to compress the springs between it and the first clamp and expose the next following portion of the core and first strand; seventeenth, applying the second clamp to the leading end of the last exposed portion of the core and first strand and so that it abuts against and forms a stop for said last applied cutting element or spring and coacts with the reapplied first clamp to hold the springs therebetween in a compressed condition; eighteenth, winding the next following portion of the piece spirally and progressively around the last exposed portion of the core and first strand in order to form another portion of the second strand of the saw cable; and nineteenth, continuing in sequence steps like the thirteenth to the eighteenth, inclusive, until the balance of the second strand and all of the other strands of the cable are formed and the saw as a whole is complete.

2. That improvement in the fabrication of a cable variety stone cutting saw of the type that consists of an endless flexible cable of predetermined length and in the form of a normally straight core and a predetermined number of side by side spiral wire strands around the core, a plurality of centrally apertured cutting elements mounted loosely on the cable in spaced apart relation and a plurality of spiral compression springs mounted loosely on the cable between the cutting elements, which comprises the following steps: first, cutting the core of the cable from normally straight core stock so that the length thereof is slightly less than the predetermined length of the cable to be formed; second, manipulating the cut core so that it is in the form of a loop and has the ends thereof disposed in opposed but spaced apart relation; third, cutting from conventional wire cable stock having the same number of spiral wire strands as the saw cable to be formed a section of cable the length of which is substantially equal to the desired total length of the saw cable multiplied by the number of spiral strands that the complete saw cable is to have; fourth, unwinding one of the strands of the cut section of conventional wire cable stock in order to provide a single pre-set spiral wire piece; fifth, straightening the extremity of one end of the piece; sixth, positioning the straightened extremity of the piece in the space between the ends of the core; seventh, winding the next following part of the piece spirally and progressively around the core until it engages and encompasses the core throughout the latter's entire length and forms the first strand of the cable for the saw; eighth, sliding the centrally apertured cutting elements and the spiral compression springs one at a time and in alternating relation onto the straightened extremity of the piece and at the same time moving them lengthwise of the core and the first strand of the cable until they are all positioned in a continuous series along the core and the first strand; ninth, applying a first stop-forming clamp to a portion of the core and first strand that is at an appreciable distance from the aforementioned straightened extremity of the piece; tenth, sliding the last applied cutting element or compression spring in the direction of the first clamp so as to compress the springs between it and the first clamp and expose the following portion of the core and first strand; eleventh, applying a second stop-forming clamp to the leading end of the exposed portion of the core and first strand and so that it abuts against and forms a stop for the last applied cutting element or spring and coacts with the first clamp to hold the springs therebetween in a compressed condition; twelfth, winding the next following part of the piece spirally and progressively around said exposed portion of the core and first strand in order to form a portion of the second strand of the cable for the saw; thirteenth, removing the first clamp in order that the springs expand to their normal length and cause certain of the cutting elements and springs to slide over and cover the aforementioned portion of the second strand and the adjacent portion of the core and first strand; fourteenth, applying the first clamp to a location on the core and first strand an appreciable distance ahead of its original location or position; fifteenth, removing the second clamp; sixteenth, sliding the last applied cutting element or spring in the direction of the reapplied first clamp in order to compress the springs between it and the first clamp and expose the next following portion of the core and first strand; seventeenth, applying the second clamp to the leading end of the last exposed portion of the core and first strand and so that it abuts against and forms a stop for said last applied cutting element or spring and coacts with the reapplied first clamp to hold the springs therebetween in a compressed condition; eighteenth, winding the next following portion of the piece spirally and progressively around the last exposed portion of the core and first strand in order to form another portion of the second strand of the saw cable; nineteenth, continuing in sequence steps like the thirteenth to the eighteenth, inclusive, until the balance of the second strand and all of the other strands of the cable are formed; twentieth, straightening the free extremity of the last formed strand; twenty-first, removing from the core the portion thereof that is adjacent to the straightened free extremity of the last formed strand; and twenty-second, inserting said straightened free extremity of the last formed strand into the space that was originally occupied by the removed portion of the core.

3. That improvement in the fabrication of an endless flexible cable of predetermined length and in the form of a normally straight core and a predetermined number of side by side spiral wire strands around the core, which comprises the following steps: first, cutting the core of the cable from normally straight core stock so that the length thereof is slightly less than the predetermined length of the cable to be formed; second, manipulating the cut core so that it is in the form of a loop and has the ends thereof disposed in opposed but spaced apart relation; third, cutting from conventional wire cable stock having the same number of spiral wire strands as the cable to be formed a section of cable the length of which is substantially equal to the desired total length of the cable multiplied by the number of spiral strands that the complete cable is to have; fourth, unwinding one of the strands of the cut section of conventional wire cable stock in order to provide a single pre-set spiral wire piece; fifth, straightening the extremity of one end of the piece; sixth, positioning the straightened extremity of the piece in the space between the ends of the core; and seventh, winding the piece spirally and progressively around the core until it completely encompasses the core, forms said predetermined number of strands and completes the cable.

4. That improvement in the fabrication of an endless flexible cable of predetermined length and in the form of a normally straight core and a predetermined number of side by side spiral wire strands around the core, which comprises the following steps: first, cutting the core of the cable from normally straight core stock so that the length thereof is slightly less than the predetermined length of the cable to be formed; second, manipulating the cut core so that it is in the form of a loop and has the ends thereof disposed in opposed but spaced apart relation; third, cutting from conventional wire cable stock having the same number of spiral wire strands as the cable to be formed a section of cable the length of which is substantially equal to the desired length of the cable multiplied by the number of spiral strands that the complete cable is to have; fourth, unwinding one of the strands of the cut section of conventional wire cable stock in order to provide a single pre-set spiral wire piece; fifth, straightening the extremity of one end of the piece; sixth, positioning the straightened extremity of the piece in the space between the ends of the core; seventh, winding the piece spirally and progressively around the core until it completely encompasses the core and forms said predetermined number of strands; eighth, straightening the free extremity of the last wound strand; ninth, removing from the core the portion of the core that is adjacent the straightened free extremity of the last formed strand; and tenth, inserting said straightened free extremity of the last formed strand into the space that was originally occupied by the removed portion of the core.

5. That improvement in the fabrication of an endless flexible cable of predetermined length and in the form of a normally straight core and a predetermined number of side by side spiral wire strands around the core, which comprises the following steps: first, cutting the core of the cable from normally straight core stock so that the length thereof is slightly less than the predetermined length of the cable to be formed; second, manipulating the cut core so that it is in the form of a loop and has the ends thereof disposed in opposed but spaced apart relation; third, cutting from conventional wire cable stock having the same number of spiral strands as the cable to be formed a section of cable the length of which is substantially equal to the desired total length of the cable multiplied by the number of spiral strands that the complete cable is to have; fourth, unwinding one of the strands of the cut section of conventional wire cable stock in order to form a single pre-set spiral wire piece; fifth, straightening the extremity of one end of the piece; sixth, positioning the straightened extremity of the piece in the space between the ends of the core; seventh, starting at one end of the core and winding the piece spirally and progressively around the core until it completely encompasses the core and forms said predetermined number of strands; eighth, straightening the free extremity of the last wound strand; ninth, removing from the core the portion of the core that is adjacent the straightened free extremity of the last formed strand; tenth, inserting said straightened free extremity of the last formed strand into the space that was originally occupied by the removed portion of the core; and eleventh, filling with "plastic" filling material the space in the cable that would have normally been occupied by the free extremity of the last wound strand had such extremity not been straightened and inserted into said space that was originally occupied by the removed portion of the core.

References Cited in the file of this patent

UNITED STATES PATENTS

| 2,679,839 | Metzger | June 1, 1954 |

FOREIGN PATENTS

| 623,685 | Great Britain | May 20, 1949 |
| 644,726 | Great Britain | Oct. 18, 1950 |